United States Patent [19]

Tanii et al.

[11] Patent Number: 5,142,316
[45] Date of Patent: Aug. 25, 1992

[54] PHOTOGRAPHIC CAMERA

[75] Inventors: Junichi Tanii, Izumi; Sadafusa Tsui, Osakasayama, both of Japan

[73] Assignee: Minolta Camera Kabushiki Kaisha, Osaka, Japan

[21] Appl. No.: 668,214

[22] Filed: Mar. 12, 1991

[30] Foreign Application Priority Data

Mar. 13, 1990 [JP] Japan .................................. 2-61900
Mar. 13, 1990 [JP] Japan .................................. 2-61901
Mar. 13, 1990 [JP] Japan .................................. 2-61902

[51] Int. Cl.⁵ .............................................. G03B 1/00
[52] U.S. Cl. ...................................... 354/212; 354/288
[58] Field of Search ........................... 354/212-216, 354/275, 288

[56] References Cited

U.S. PATENT DOCUMENTS

| | | | |
|---|---|---|---|
| 4,363,547 | 12/1982 | Hashimoto et al. | 354/212 |
| 4,384,780 | 5/1983 | Bresson | 354/288 |
| 4,841,319 | 6/1989 | Hansen | 354/275 |
| 4,870,437 | 9/1989 | Omaki et al. | 354/214 |

Primary Examiner—L. T. Hix
Assistant Examiner—David M. Gray
Attorney, Agent, or Firm—Burns, Doane, Swecker & Mathis

[57] ABSTRACT

A camera using a film of cartridge type. A strip of film is accommodated in a shell in the form of a roll filmstrip which is wound on a film spool. The film is automatically loaded into the camera when the film cartridge is accommodated in a cartridge chamber of the camera. When the film spool is rotated in the roll filmstrip loosening direction, the filmstrip is fed forward from the shell through the film exit of the film cartridge. When the film spool is rotated in the opposite direction, the film is rewound and drawn back into the shell. The camera is provided with a receiving member between the cartridge chamber and a film exposing opening. The receiving member engages the film exit of the film cartridge accommodated in the cartridge chamber. Consequently, the space in the shell of the film cartridge and the space in the film exposing opening are connected with each other in light-intercepted condition. The film cartridge and the receiving member are pressed against each other.

12 Claims, 6 Drawing Sheets

PHOTOGRAPHIC CAMERA

BACKGROUND OF THE INVENTION

1. Field of the invention

The present invention relates to a photographic camera.

2. Description of the related art

There is disclosed in U.S. Pat. No. 4,870,437 a photographic camera in which initial film loading is automatically performed after loading the camera with a film cartridge. According to the disclosure, the film cartridge is loaded into the cartridge chamber not by opening the entire back cover of the camera body but opening a lid formed in the bottom of the cartridge chamber itself. This camera has a light-intercepted slit between the cartridge chamber and the film exposing portion located adjacent the cartridge chamber in the camera. The film passes through the light-intercepted slit from the cartridge chamber into the film exposing portion. Therefore, even though the lid of the cartridge chamber is opened by mistake while the camera is loaded with the film, the parts of filmstrip in the cartridge and the film exposing portion are prevented from exposing to light.

According to the camera of the above construction, a part of the filmstrip between the film outlet of the cartridge and the light-intercepted slit is exposed in the cartridge chamber. The interior of the cartridge chamber is completely intercepted from light when the lid of the cartridge chamber is closed. But if the lid is opened by mistake while the film cartridge is loaded into the camera, the part of filmstrip between the film outlet and the slit is exposed to light. In order to prevent the lid from being erroneously opened, it is effective to provide the cartridge chamber with a transparent window for allowing the film cartridge loaded into the cartridge chamber to be visually recognized from the exterior of the camera body. However, if such a transparent window is employed in the cartridge chamber of the camera disclosed in the above publication, the filmstrip will be exposed to the light which will have leaked from the transparent window into the cartridge chamber.

U.S. Pat. No. 4,363,547 discloses a construction in which a case for holding a film cartridge is pivotally supported between an open position outside the camera body for inserting the film cartridge into the case or ejecting it therefrom and an accommodation position in which the cartridge is loaded into the camera. According to the construction, there is provided on the bottom portion of the holding case a driving shaft which engages the film spool provided in the cartridge, thus transmitting the rotational force thereto. The driving shaft pivots together with the holding case. Therefore, it is necessary to provide the driving shaft with a mechanism for maintaining the connection between the driving shaft and the driving force transmitting system with the pivotal motion of the holding case, which prevents the manufacture of a compact camera.

According to a known camera, in order to properly hold a film cartridge such as a film patrone to a cartridge chamber, the cartridge is elastically clamped in the direction perpendicular to the spool provided in the cartridge. According to this construction, in inserting the cartridge into the cartridge chamber in the axial direction of the spool of the cartridge, a mechanism for clamping the cartridge may prevent the cartridge from being inserted into the cartridge chamber or ejected therefrom due to the fact that the cartridge entrance/exit for the cartridge chamber is not great. If the elastic force of the clamping mechanism is reduced to facilitate the insertion and ejection of the cartridge, the cartridge cannot be properly held to the cartridge chamber favorably.

SUMMARY OF THE INVENTION

It is an object of the present invention to provide a camera, having a high light-intercepting performance, in which the film is loaded into the camera by inserting a film cartridge such as a patrone into a film cartridge chamber of the camera.

It is another object of the present invention to provide a camera, having a construction in which an initial film loading is automatically performed if an operator only inserts a film cartridge such as a patrone thereinto, in which even though a lid of a film chamber of the camera is opened by mistake, no parts of the filmstrip is exposed to light.

It is still another object of the present invention to provide a camera, having a construction in which a chamber for accommodating a film cartridge is opened and closed by pivoting of a film cartridge holder provided in the chamber, in which the construction of a mechanism for driving the spool of the film cartridge is simplified.

It is a further object of the present invention to provide a camera having a clamping mechanism which reliably holds a cartridge to a cartridge accommodating chamber and allowes the cartridge to be inserted into the chamber with no possibility of the cartridge being obstructed by any member.

In accomplishing this and other objects of the present invention, a photographic camera, according to an embodiment of the present invention, using a film cartridge, which accommodates a strip of film wound on a film spool in a shell having a film passing slit such that the film is intercepted from ambient light comprises: a film cartridge chamber, for accommodating the film cartridge, having a cartridge passing opening allowing the passage of the film cartridge in loading the film cartridge into the camera and ejecting the film cartridge therefrom; an exposing section for exposing to light a part of the film fed out of the film passing slit of the film cartridge accommodated in the film cartridge chamber; a film take-up chamber, connected with the exposing section and intercepted from ambient light, for winding the part of the film exposed in the exposing section; and connecting means, engaging the film passing slit of the film cartridge accommodated in the film cartridge chamber, for connecting the film cartridge and said exposing section with each other such that the gap between the film cartridge and exposing section allows therethrough the passage of the film and is intercepted from ambient light.

The film cartridge chamber may have a transparent window for visually checking whether or not the film cartridge is accommodated in the film cartridge chamber.

A film of a cartridge type is used by the camera the above construction. The film of the cartridge type is not limited to a film of a specific structure as described in the embodiment of the present invention. The cartridge type of film indicates a structure in which a strip of film wound on a spool is accommodated in a shell, and the film is sequentially fed from the shell when the spool rotates in the direction in which the film is loosened and can be wound on the spool when the spool rotates in the direction in which the film is tightened. The film is light-intercepted in the shell. Unlike the conventional type of patrone, the leading end portion of the filmstrip of this type is accommodated in the shell before the film cartridge is loaded into the camera.

According to this camera, when the film cartridge is loaded into the camera, the cartridge is put into the film cartridge chamber by opening only the film cartridge chamber. Neither the exposing portion nor the film take-up chamber is opened. A frame exposed to light for photographing and the following frame which is to be exposed to light are accommodated in the light-intercepted space of the exposing portion and the film take-up chamber while other frames of the film which have not exposed to light for photographing are not fed forward from the film cartridge. When the cartridge is loaded into the cartridge chamber, the connecting means engages the film passing slit of the film cartridge. As a result, the gap between the film passing slit and the film exposing portion communicate with each other. The connecting means communicates the space in the film cartridge and the space in the film exposing portion with each other in light-intercepted condition. Therefore, the filmstrip taken out of the film passing slit of the cartridge is not exposed to light in the film cartridge chamber and fed into the film exposing portion via the connecting means. As such, the film is not exposed to light except when the shutter is released. As apparent from the above description, even though the transparent window for visually checking whether or not the cartridge is accommodated in the film cartridge chamber, the filmstrip can be prevented from being exposed to light in the film cartridge chamber while the filmstrip is being fed from the cartridge to the film exposing portion.

A photographic camera, according to another embodiment of the present invention, using a film cartridge, which accommodates a strip of film wound on a film spool in a shell having a film passing slit such that the film is intercepted from ambient light comprises: a cartridge holder having an opening through which the film cartridge can be inserted thereinto and removed therefrom in the axial direction of the film spool; supporting means for supporting the cartridge holder so that the cartridge holder is movable between an open position at which the opening is exposed to the exterior of the camera body and an accommodation position at which the opening is accommodated in the camera body; driving means, projecting from the bottom of the cartridge holder which is at said accommodation position and engaging the film spool of the film cartridge accommodated in the cartridge holder, for rotating the film spool; and pressing means for pressing the film cartridge accommodated in said cartridge holder which is at the accommodating position toward the driving means in the axial direction of the film spool.

The film of the cartridge type is also used by the photographic camera of the above structure.

According to this camera, the film cartridge is loaded into the cartridge chamber of the camera letting the cartridge holder intervene. The film cartridge is inserted into the cartridge holder and removed therefrom by moving the film cartridge in the axial direction of the film spool of the cartridge. The supporting means supports the film cartridge. The cartridge holder is movable between the open position at which the opening of the cartridge holder is exposed to the exterior of the camera body and the accommodation position at which the opening thereof is accommodated in the camera body. When the cartridge is at the accommodation position, the driving means transmits rotation force to the film spool of the cartridge. Since the driving means is fixed to the camera body, the driving means does not follow the pivotal motion of the cartridge holder. The driving means projects from the bottom of the holder into the cartridge chamber only when the holder is at the accommodation position. Accordingly, when the cartridge is accommodated in the holder which is at the accommodation position, the driving means engages the film spool of the cartridge. Consequently, the driving force is transmitted from the driving means to the film spool. The pressing means presses the cartridge accommodated in the holder which is at the accommodation position toward the driving means in the axial direction of the film spool, thus stabilizing the posture of the cartridge.

This structure eliminates the need for the provision of a mechanism for moving the driving means so as to follow up the holder which pivots. Therefore, the structure is simplified and compact. Further, since the cartridge accommodated in the holder at the accommodation position is fixed to the holder by the pressing means, the film can be fed stably and reliably.

A photographic camera, according to still another embodiment of the present invention, using a film cartridge, which accommodates a strip of film wound on a film spool in a shell having a film passing slit such that the film is intercepted from ambient light comprises: a cartridge chamber, for accommodating the film cartridge, having an opening for allowing the film cartridge to be inserted thereinto and removed therefrom in the axial direction of the film spool; pressing means for pressing the film cartridge accommodated in the cartridge chamber in perpendicular to the axial direction of the film spool and in parallel with the direction in which the film accommodated in the film cartridge is fed out; supporting means for supporting the film cartridge pressed by said pressing means; actuating means for actuating a pressing operation of the pressing means in association with an operation for inserting the film cartridge into said cartridge chamber and an operation for releasing the pressing operation of the pressing means in association with an operation for ejecting the film cartridge from the cartridge chamber.

The film of the cartridge type is also used by the photographic camera of the above structure.

According to this camera, the cartridge is inserted into the cartridge chamber in the axial direction of the film spool. The cartridge accommodated in the cartridge chamber is fixed thereto by being clamped between the pressing means and the supporting means in the direction perpendicular to the axis of the film spool. The pressing means and the supporting means operate after the cartridge is inserted into the cartridge chamber. Therefore, neither the pressing means nor the supporting means interfere with the operation for inserting the cartridge into the cartridge chamber. When the cartridge is discharged from the cartridge accommodating chamber, the cartridge is released from the pressing means and the supporting means immediately before the operation for discharging the cartridge from the cartridge chamber. Consequently, neither the pressing means nor the supporting means interfere with the operation for discharging the cartridge from the cartridge chamber. Further, since the cartridge is firmly fixed to the cartridge chamber when the cartridge chamber is at the accommodated position, the filmstrip can be reliably fed from the cartridge or rewound. The start timing of the operation for clamping the cartridge between the pressing means and the supporting means and the release timing of the operation for releasing the cartridge therefrom are obtained when the actuating means is actuated in a sequence of the cartridge loading operation and then the pressing means is interlocked with the operation of the actuating means.

The actuating means may be the cartridge ejecting means or the cover for opening or closing the opening of the cartridge chamber.

Supposing that the actuating means is the cartridge ejecting means, the pressing means presses the cartridge in association with the operation of the ejecting means to be carried out when the cartridge is inserted into the cartridge chamber and releases the cartridge in association with the operation of the ejecting means for ejecting the cartridge from the cartridge chamber.

Supposing that the actuating means is the cover of the camera body, the pressing means presses the cartridge in unison with the cover closing operation and releases the cartridge in association with the cover opening operation.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
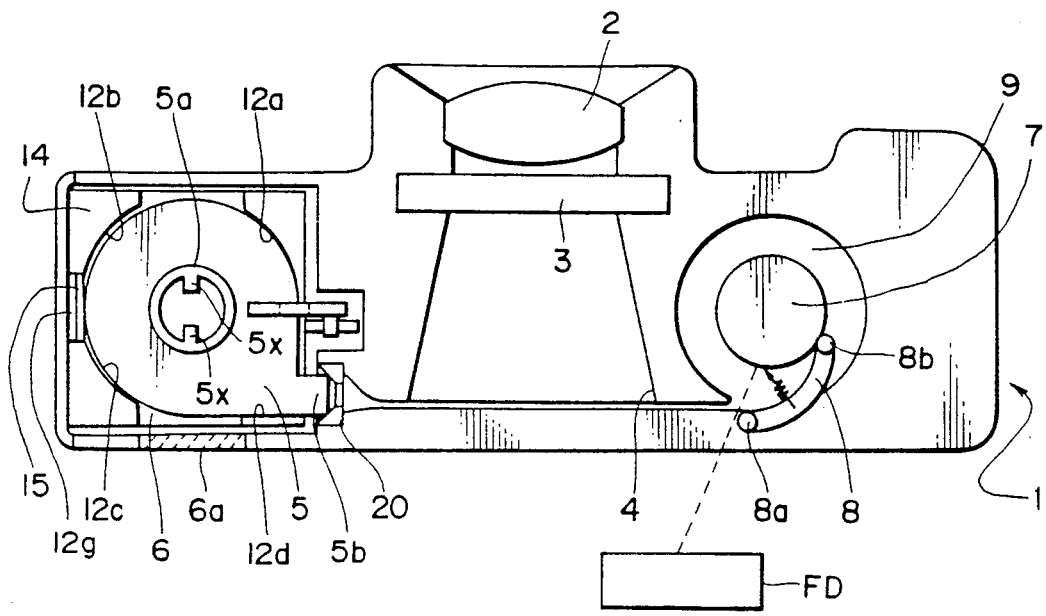
FIG. 1 is an explanatory view showing transversely sectionally a schematic structure of a camera according to a first embodiment of the present invention.

Before the description of the present invention proceeds, it is to be noted that like parts are designated by like reference numerals throughout the accompanying drawings.

A film cartridge of a photographic camera to be used in the embodiments of the present invention is disclosed, for example, in U.S. Pat. No. 4,834,306. A filmstrip wound on a film spool is accommodated in the cartridge shell having a film entrance/exit slit which is light-intercepted. In the initial (brand-new) condition of the film cartridge, the leading end portion of the filmstrip is accommodated in the shell. The film cartridge has in the film spool thereof a disk rotatable and having a cylindrical rib. When the film spool is rotated in the direction in which the filmstrip wound on the spool is loosened, the filmstrip, the disk, and the spool are rotated altogether. In this manner, the leading end portion of the filmstrip is fed out of the film entrance/exit slit.

Figure 2:
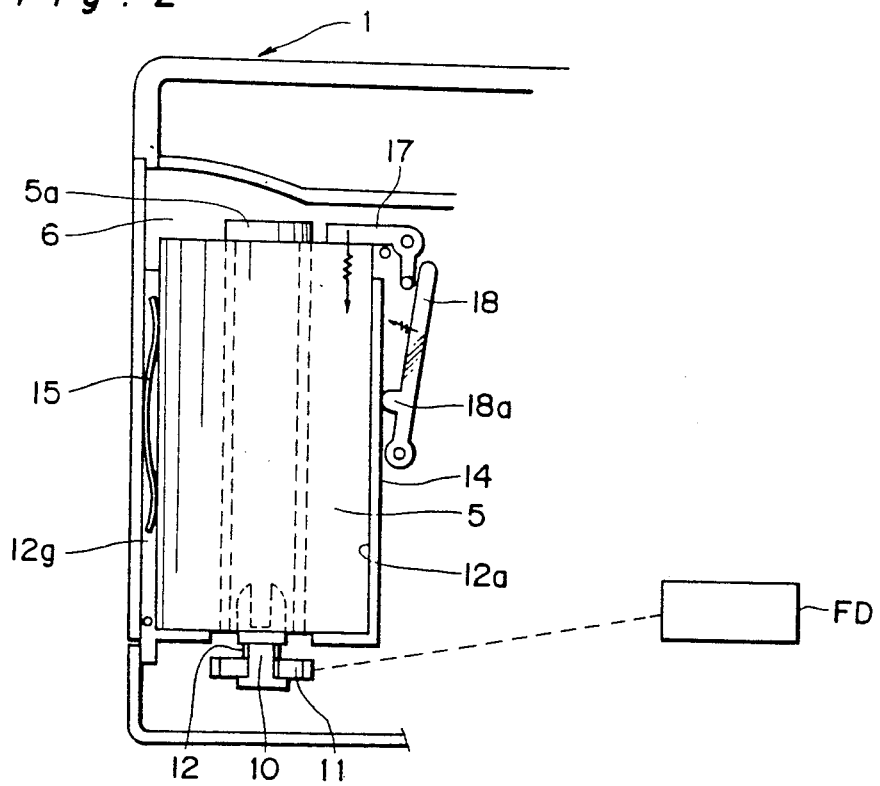
FIG. 2 is an explanatory view showing longitudinally sectionally a schematic structure of the cartridge chamber of the camera shown in FIG. 1.

Reference numeral 1 in FIGS. 1 and 2 denotes the camera. The camera 1 of the first embodiment comprises a photographing lens 2, a shutter 3, and a film exposure opening 4. The camera 1 further comprises a cartridge chamber 6 for accommodating the film cartridge 5 and a take-up drum chamber 9 accommodating a take-up drum 7 on which the filmstrip fed from the cartridge 5 is wound. The take-up spool chamber 9 accommodates a lever 8 for guiding the filmstrip to the take-up spool 7 and allowing the filmstrip to be reliably wound on the spool 7 without loosening the filmstrip. That is, the base portion of the lever 8 is supported by a shaft 8a so that the lever 8 is pivotable about the shaft 8a. A roller 8b provided at the top end portion of the lever 8 is urged by a spring to contact the spool 7.

A transparent window 6a is formed on the rear side of the camera at the cartridge chamber 6 so that the interior of the cartridge chamber 6 is viewed from the outside of the camera body. As shown in FIG. 2, a fork member 10 which engages the film spool 5a of the cartridge 5 is provided on the bottom portion of the cartridge chamber 6. Thus, the fork member 10 rotates the spool 5a in the film feeding direction and rewinding direction. The fork member 10 rotates together with a driving gear 11 mounted on the base portion thereof and is slidable in the axial direction of the driving gear 11. The fork member 10 is urged upward by a spring 12 so that the upper end portion thereof projects into the cartridge chamber 6.

Figure 3:
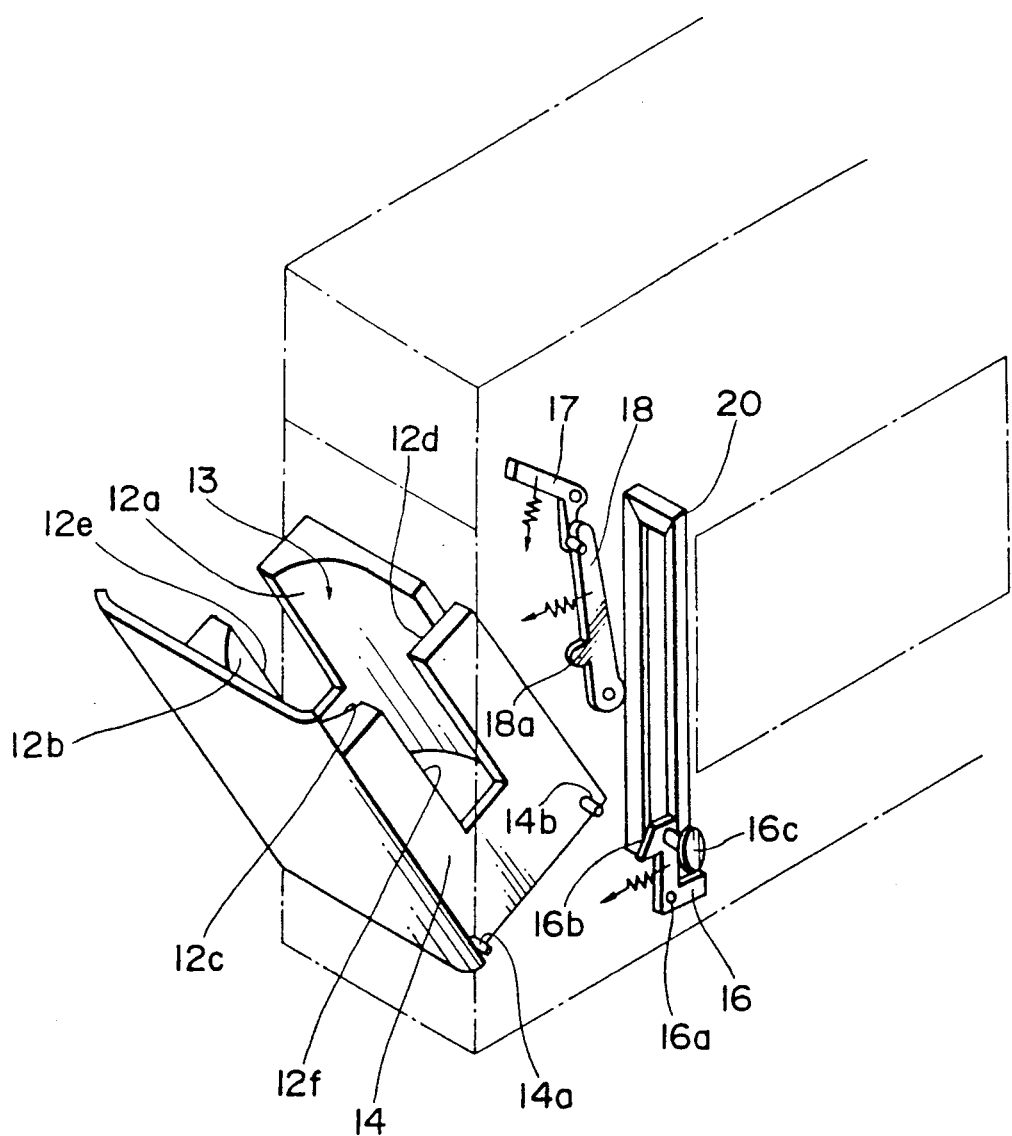
FIG. 3 is an explanatory view showing perspectively the cartridge chamber shown in FIG. 2 which has been opened.
Figure 4:
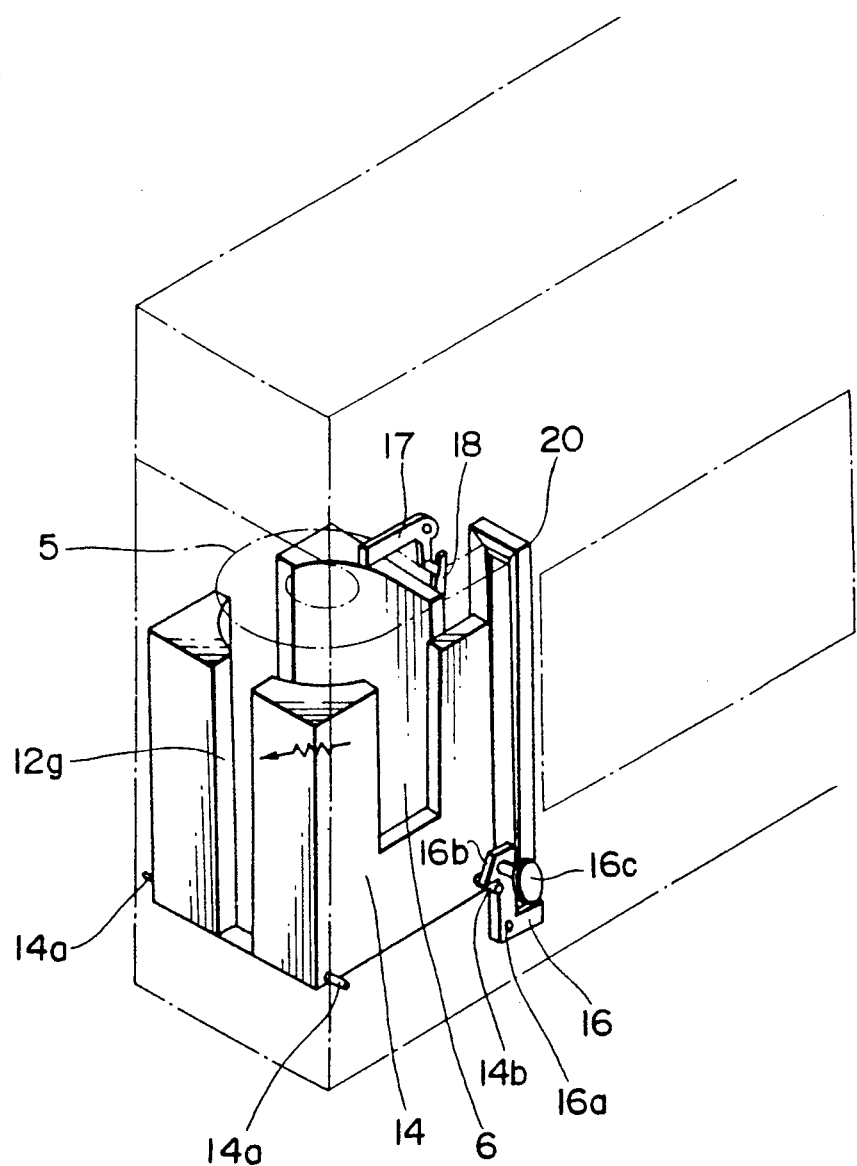
FIG. 4 is an explanatory view showing perspectively the cartridge chamber shown in FIG. 3 which has been closed.

The cartridge chamber 6 has in the upper portion thereof an opening 13 for taking in or out the cartridge 5 endwise, i.e. axially, and a cartridge holder 14 having inner walls 12a, 12b, 12c, and 12d formed in conformity with the configuration of the peripheral surface of the cartridge shell. Referring to FIGS. 3 and 4, the cartridge holder 14 is pivotably supported by a shaft 14a between the open position at which the holder 14 inclines, thus projecting transversely from the camera body and the accommodation position at which the holder 14 stands vertically in the camera body. Cut-outs 12e and 12f are formed on the front and rear walls of the holder 14 so that the cartridge 5 is caught with fingers. A longitudinal groove 12g is formed between the inner walls 12b and 12c which are adjacent to the wall of the camera body. There is provided in the groove 12g a leaf spring 15 for urging the film cartridge 5 inserted into the holder 14 toward the direction perpendicular to the axis of the film spool 5a. The cartridge holder 14 is urged toward the open position, but it is prevented from pivoting further from the open position shown in FIG. 3. When the holder 14 is at the accommodation position, i.e., when the holder 14 stands vertically in the camera body, a pin 14b formed on the holder 14 is locked by a locking lever 16 so that the holder 14 is prevented from pivoting counterclockwise, namely, inclining toward the open position. The locking lever 16 is rotatable about a shaft 16a and urged by a spring toward the position at which the locking lever 16 keeps locking the pin 14b. When the holder 14 is rotated clockwise and stands vertically in the camera body, the pin 14b keeps pressing the inclined surface 16b of the locking lever 16 downward. As a result, the locking lever 16 rotates clockwise beyond the position for locking the holder 14. When the pin 14b moves away from the inclined surface 16b, the locking lever 16 is returned to the position for locking the pin 14b by urging force being applied thereto. Consequently, the locking lever 16 locks the pin 14b. The locking lever 16 is coupled with a knob 16c exposed to the exterior of the camera body. The pin 14b is unlocked from the locking lever 16 by operating the knob 16c. As a result, the cartridge holder 14 is allowed to pivot toward the open position shown in FIG. 3, namely, pivot counterclockwise.

When the cartridge holder 14 is at the accommodation position, the film cartridge 5 is fixed to the holder 14 by two pressing levers 17 and 18 which cooperate with each other. The levers 17 and 18 are elastically urged by each spring to pivot counterclockwise in FIG. 3. The upper surface of the film cartridge 5 at the accommodation position is pressed downward by the lever 17. As a result, the film cartridge 5 is fixed to the holder 14. With the movement of the lever 17 away from the upper surface of the cartridge 5, the cartridge 5 is unlocked from the lever 17. When the holder 14 pivots counterclockwise, namely, when it moves rotates from the accommodation position to the open position, the lever 18 is rotated counterclockwise by urging force as shown in FIG. 3, thus applying force to the lever 17. As a result, the lever 17 is rotated clockwise as shown in FIG. 3. Due to this operation, the lever 17 moves away from the upper surface of the film cartridge 5 and the pivotal locus of the cartridge 5, thus allowing the pivotal motion of the cartridge 5. When the cartridge holder 14 moves from the open position to the accommodation position, a projection 18a of the lever 18 is pressed by the holder 14. As a result, the lever 18 pivots clockwise, and the upper end portion of the lever 18 moves away from the lever 17. Therefore, the lever 17 is rotated counterclockwise by the urging force of the spring. When the cartridge holder 14 is at the accommodation position, the lever 17 presses the upper surface of the film cartridge 5 downward. In this manner, the film cartridge 5 is reliably fixed to the cartridge holder 14. Thus, the engagement between the fork member 10 and the film spool 5a of the cartridge 5 can be reliably accomplished. The description of this engagement is described more specifically below. If, in placing the cartridge holder 14 accommodating the film cartridge 5 in the accommodation position, the position of the fork member 10 is uncoincident with the position of the engaging portions 5x and 5x of the film spool 5a and as a result, the fork member 10 and the engaging portions 5x and 5x do not engage with each other, the cartridge 5 is pressed downward by the lever 17 and consequently, the fork member 10 is moved downward due to the elastic deformation of the spring 12. Therefore, the film cartridge 5 does not project upward from the cartridge holder 14. According to the rotation of the fork member 10 accompanied by the feeding of film, the fork member 10 reliably engages the engaging portions 5x and 5x of the film spool 5a. The film cartridge 5 is more stable in the cartridge holder 14 if the force of the lever 17 is stronger than that of the spring 12.

As described above, the urging force of the leaf spring 15 is applied to the film cartridge 5 fixed to the cartridge holder 14. As a result, the film entrance/exit 5b of the cartridge 5 is brought into contact with four inclined surfaces of a receiving member 20. The receiving member 20 is positioned between the cartridge chamber 6 and the exposure opening 4. A sheet of light intercepting velvet cloth is stuck to each inclined surface. A longituctinal rectangular opening through which the film is inserted is formed in the center of the receiving member 20 surrounded with the four inclined surfaces as shown in FIG. 3. When the film cartridge 5 contacts the receiving member 20, the film entrance/exit 5b of the cartridge 5 and the opening of the receiving member 20 communicate with each other and the gap provided therebetween is light-intercepted. Further the whole inner space, i.e. the film exposing portion comprising the shutter 3 as well as the exposure opening 4 and the take-up spool chamber 9, is light-intercepted too. Accordingly the contact between the cartridge 5 and the receiving member 20 forms a dark box. Therefore, even though light leaks from the transparent window 6a formed on the rear side of the cartridge chamber 6 into the interior of the cartridge chamber 6, the filmstrip fed from the cartridge 5 is not exposed to light in the cartridge chamber 6.

A film driving device FD shown in FIGS. 1 and 2 drives the fork member 10 to feed the filmstrip from the cartridge 5 or to rewind it. After the leading end portion of the filmstrip is wound onto the take-up spool 7, the filmstrip is fed to the drum 7 according to the rotation thereof.

Figure 5:
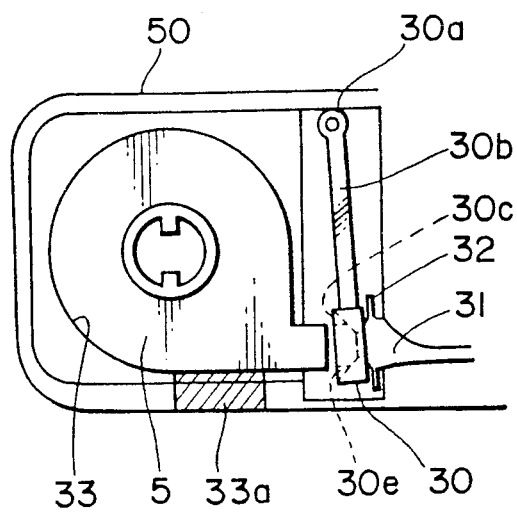
FIG. 5 is an explanatory view showing transversely sectionally a schematic structure of a cartridge chamber of a camera according to a second embodiment of the present invention.
Figure 6:
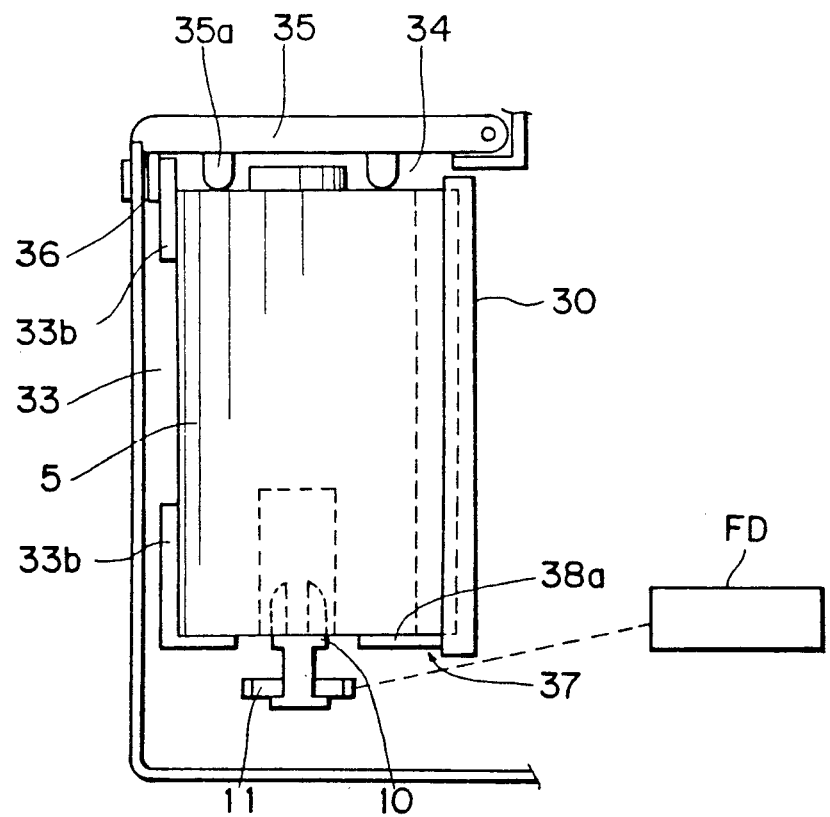
FIG. 6 is an explanatory view showing longitudinally sectionally a schematic structure of the cartridge chamber shown in FIG. 5.
Figure 7:
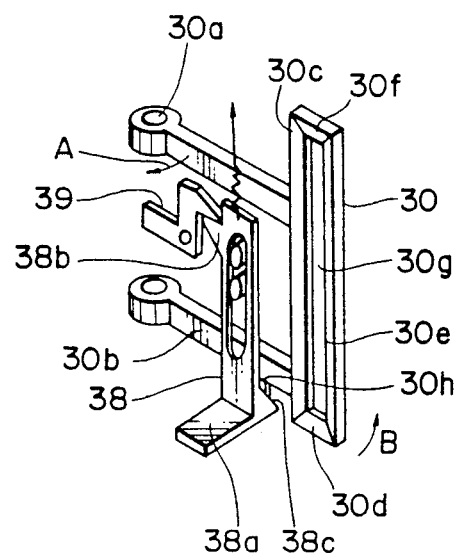
FIG. 7 is a perspective view showing a receiving member and a cartridge ejecting mechanism provided in the cartridge chamber shown in FIGS. 5 and 6.
Figure 8:
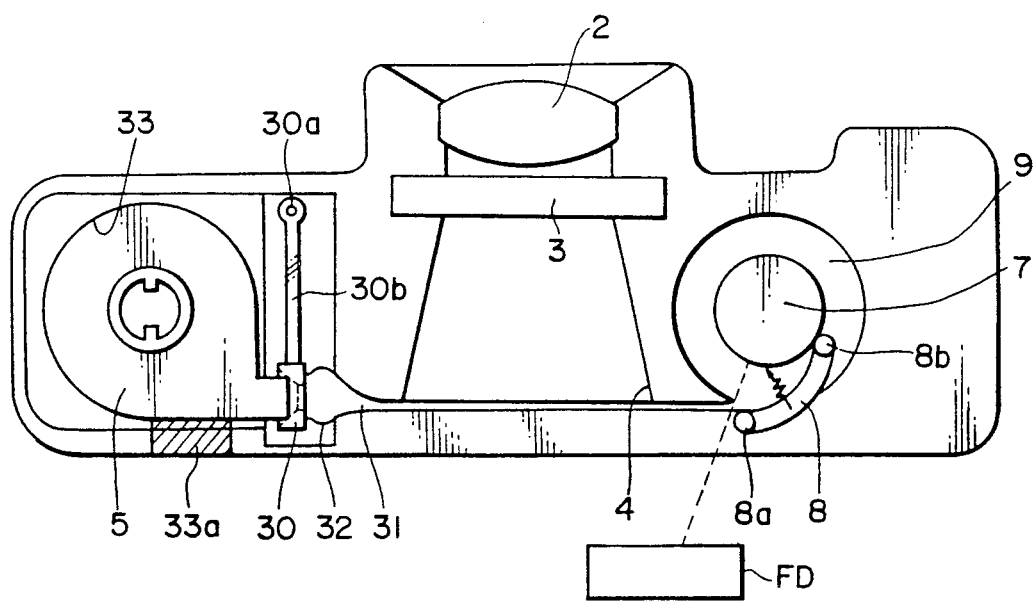
FIG. 8 is an explanatory view showing transversely sectionally a schematic structure of the camera, according to the second embodiment of the present invention, shown in FIGS. 5 and 6.

Referring to FIG. 5 through FIG. 8, a photographic camera according to a second embodiment of the present invention is described below. Similarly to the receiving member 20 of the first embodiment, a receiving member 30 comprising four inclined surfaces 30c, 30d, 30e, and 30f having a sheet of light intercepting velvet cloth stuck thereto and an opening 30g is provided. A pair of arms 30b supports the receiving member 30 such that the receiving member 30 is pivotable about a shaft 30a. The gap between the opening 30g of the receiving member 30 and a film entrance 31 communicating with the film exposing portion is intercepted with an elastic light-intercepting rubber 32 so as to permit the pivotal motion of the receiving member 30. FIG. 5 shows the light intercepting member 32 which has contracted. FIG. 8 shows the light intercepting member 32 which has expanded.

FIG. 6 is a longitudinal sectional view showing the construction of a cartridge chamber 33 schematically. A hinged cover 35 is mounted on the upper portion of the cartridge chamber 33 such that the cover 35 constitutes a part of the upper surface of the camera body. A cartridge entrance/exit 34 is opened by opening the cover 35. A pair of projections 35a for pressing the cartridge downward is formed on the lower surface of the cover 35. A locking mechanism 36 provided on one end portion of the cover 35 locks the cover 35. A transparent window 33a for looking into the interior of the cartridge 5 from the exterior of the camera body is formed on one side of the cartridge chamber 33 positioned on the rear side of the camera body. Referring to FIG. 6, the fork member 10, the driving gear 11, and a cartridge supporting portion 38a of a cartridge ejecting mechanism 37 as shown in FIG. 7 are provided on the bottom portion of the cartridge chamber 33. The fork member 10 of the second embodiment is urged to be slidable upward in the axial direction of the driving gear 11 and rotates together with the driving gear 11.

As shown in FIG. 7, the ejecting mechanism 37 comprises an L-shaped lever 38 vertically movable and elastically urged upward and a locking lever 39 which engages and disengages one end of the L-shaped lever 38 so as to lock and unlock the lever 38 which moves upward. The lever 38 is bent approximately perpendicularly. The bottom plate of the lever 38 serves as the cartridge supporting portion 38a. An elongated opening is formed on the vertical portion of the lever 38 so that the elongated opening guides and regulates the vertical movement of the lever 38. Projections penetrate through the elongated opening. A projection 38b which engages and disengages the locking lever 39 is formed on an upper portion of the vertical portion of the lever 38. An inclined surface 38c projects rearward from the bent portion of the lever 38. When the lever 38 moves upward, the inclined surface 38c is brought into contact with a projection 30h projecting downward from the lower end portion of the arm 30b of the receiving member 30. The arm 30b and the receiving member 30 rotate in the direction shown by the arrow (B) because they are pressed by the inclined surface 38c while they are urged in the direction shown by the arrow (A) shown in FIG. 7. That is, in the operation for ejecting the film cartridge 5 from the camera, simultaneously with the upward movement of the cartridge 5, the receiving member 30 pivots away from the film entrance/exit 5b of the cartridge 5. Therefore, the receiving member 30 does not prevent the upward movement of the film cartridge 5. When the ejection of the film cartridge 5 is completed, the lower end portion of the inclined surface 38c is in contact with the side face of the arm 30b. The receiving member 30 pivots toward the position at which the receiving member 30 is away from the movement line of the film entrance/exit 5b of the cartridge 5 so as not to interfere with the film entrance/exit 5b. When the film cartridge 5 is inserted into the cartridge chamber 33, the cartridge supporting portion 38a is pressed downward by the film cartridge 5. Therefore, the lever 38 and the inclined surface 38c move downward. As a result, the arm 30b and the receiving member 30 rotate in the direction shown by the arrow (A) while the projection 30h of the arm 30b is moving downward in contact with the inclined surface 38c. When the insertion of the film cartridge 5 into the cartridge chamber 33 is completed, the receiving member 30 contacts the film entrance/exit 5b in a light-intercepted condition. The force applied by the receiving member 30 to the cartridge 5 is supported by inner wall 33b (shown in FIG. 6) formed inside the cartridge chamber 33.

The locking lever 39 is coupled with the cover 35 by a mechanism not shown. When the cover 35 is completely opened, the locking lever 39 positioned to lock the lever 38 as shown in FIG. 7 changes its posture to unlock the lever 38. Therefore, upon opening of the cover 35, the cartridge 5 is automatically ejected from the cartridge chamber 33. FIG. 8 is a transverse sectional view showing a schematic construction of the entire camera according to the second embodiment. Each member illustrated on the right from the film entrance 31 in FIG. 8 is identical to that of the first embodiment shown in FIG. 1.

Figure 9:
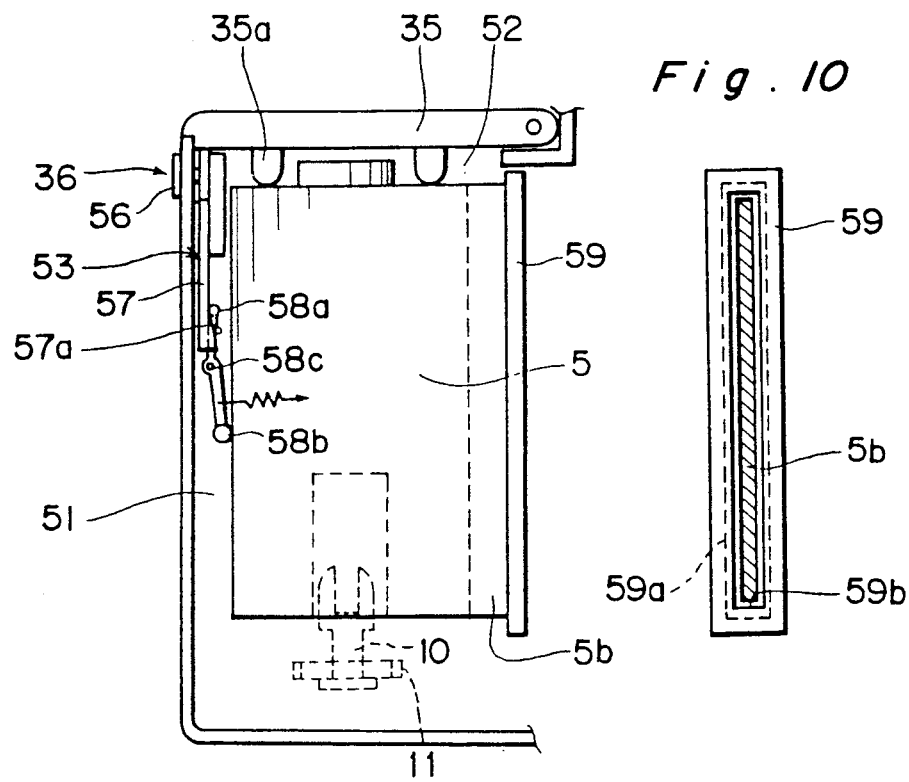
FIG. 9 is an explanatory view showing transversely sectionally a schematic structure of a cartridge chamber of a camera according to a third embodiment of the present invention.
Figure 10:
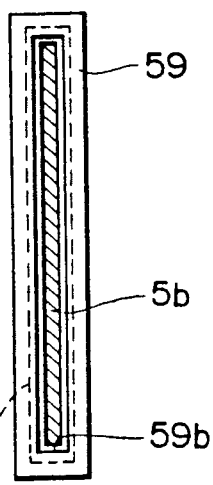
FIG. 10 is a view showing the receiving member, shown in FIG. 9, which is viewed from the left side of FIG. 9.
Figure 11:
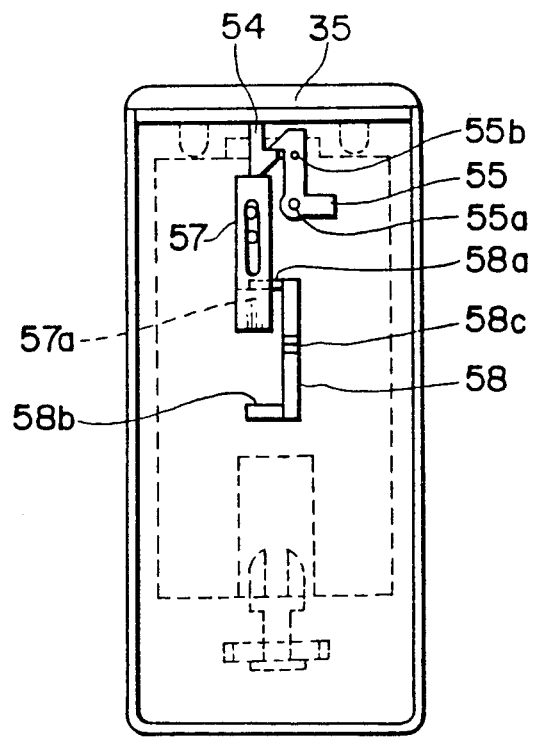
FIG. 11 is an explanatory view showing the cartridge chamber, shown in FIG. 9, which is viewed from the left side of FIG. 9.

A third embodiment according to the present invention is shown in FIG. 9 through FIG. 11.

As shown in FIG. 9, the cover 35, the locking mechanism 36 thereof, the fork member 10, and the driving gear 11 thereof are constructed similarly to those of the second embodiment described above. The locking mechanism 36 is interlocked with a pressing mechanism 53 which presses the film cartridge 5 inserted into a cartridge chamber 51 in the direction perpendicular to the axis of the film spool 5a. As shown in detail in FIG. 11, the locking mechanism 36 comprises a hook member 54 fixed to the cover 35 and a locking lever 55 supported by a shaft 55a so that the lever 55 is pivotable between the position for locking the hook member 54 and the unlocking position which is away from the hook member 54. Referring to FIG. 9, the lever 55 is connected with a knob 56 via a pin 55b urged by an urging means not shown so that the lever 55 pivots to the position at which the lever 55 locks the hook member 54. The knob 56 is provided on the outer surface of the camera body.

As shown in FIG. 9, the pressing mechanism 53 provided in the cartridge chamber 51 is opposed to the receiving member 59 so that the cartridge 5 inserted into the cartridge chamber 51 is pressed toward the receiving member 59. The pressing mechanism 53 further comprises a moving member 57 which is pressed downward by the hook member 54 when the cover 35 is closed and a pressing lever 58 which is rotated about a shaft 58c when the lever 58 engages an inclined surface 57a formed on the lower end portion of the moving member 57. The moving member 57 is elastically urged upward. The lever 58 has upper and lower arms which pivot on the axis 58c of the lever 58. A pin 58a which contacts the inclined surface 57c of the moving member 57 is formed on the upper arm. A pin 58b which presses the side face of the film cartridge 5 inserted into the cartridge chamber 51 is formed on the lower end of the lower arm. The pressing member 58 is elastically urged to rotate counterclockwise.

Referring to FIG. 10, the receiving member 59 is flatly formed and has light-intercepting cloth stuck thereon. The film entrance/exit 5b of the cartridge 5 contacts a supporting surface 59a formed in the periphery of the receiving member 59. The filmstrip is inserted into an opening 59b formed in the center of the receiving member 59.

According to the third embodiment of the above construction, when the film cartridge 5 is inserted into the cartridge chamber 51 and the cover 35 is closed, the hook member 54 of the locking mechanism 36 is locked by the lever 55, thus pressing the moving member 57 of the pressing mechanism 53 downward. With the downward movement of the moving member 57, the lever 58 is rotated counterclockwise by the urging force with the contact pin 58a thereof being in contact with the inclined surface 57a. As a result, the pressing pin 58b presses the film cartridge 5 toward the direction perpendicular to the axis of the film spool of the cartridge 5. Consequently, the film entrance/exit 5b of the cartridge 5 contacts the receiving member 59 such that the film exposing portion and the take-up drum chamber communicate with the film cartridge 5 in the light-intercepted condition. In this embodiment, the cartridge entrance/exit of the cartridge chamber 51 is denoted by reference numeral 52 in FIG. 9.

In each embodiment, the receiving member may be provided with a portion which engages the film entrance/exit 5b of the cartridge 5 in a predetermined length along the film feeding direction. Thus, even though the cartridge 5 moves a slight degree due to a shock, light can be preferably intercepted.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A photographic camera, using a film cartridge, which accommodates a strip of film wound on a film spool in a shell having a film passing slit such that said film is intercepted from ambient light comprising:
    a film cartridge chamber, for accommodating said film cartridge, having a cartridge passing opening allowing the passage of said film cartridge in loading said film cartridge into said camera and unloading said film cartridge therefrom;
    an exposing section for exposing to light a part of said film fed out of said film passing slit of said film cartridge accommodated in said film cartridge chamber;
    a film take-up chamber, connected with said exposing section and intercepted from ambient light, for winding the part of said film exposed to light in said exposing section; and
    connecting means, engaging said film passing slit of said film cartridge accommodated in said film cartridge chamber, for connecting said film cartridge and said exposing section with each other and for allowing the passage of said film therethrough while also intercepting ambient light so as to prevent the film which is being transmitted from said film passing slit to said exposing section from being exposed to light even if ambient light enters said film cartridge chamber.

2. A photographic camera as claimed in claim 1, wherein said film cartridge chamber has a transparent window for visually checking whether or not said film cartridge is accommodated in said film cartridge chamber.

3. A photographic camera as claimed in claim 1, wherein said cartridge passing opening of said film cartridge chamber is constructed so that said film cartridge is inserted into said film cartridge chamber along a direction substantially parallel with an axis of said film spool.

4. A photographic camera as claimed in claim 3, wherein said connecting means includes a connecting member movable between an engaging position at which said connecting member engages said film passing slit of said film cartridge accommodated in said film cartridge chamber and an away position which is away from said engaging position.

5. A photographic camera as claimed in claim 3, wherein said connecting means includes a connecting member formed to substantially engage said film passing slit of said film cartridge accommodated in said film cartridge chamber.

6. A photographic camera as claimed in claim 3, wherein said connecting means engages said film passing slit after said film cartridge is accommodated in said film cartridge chamber.

7. A photographic camera, using a film cartridge, which accommodates a strip of film wound on a film spool in a shell having a film passing slit such that said film is intercepted from ambient light comprising:
    a cartridge holder having an opening through which said film cartridge can be inserted thereinto and removed therefrom along the axial direction of said film spool;
    supporting means for supporting said cartridge holder so that said cartridge holder is movable between an open position at which said opening is exposed to the exterior of the camera body and an accommodation position at which said opening is accommodated in said camera body;
    driving means, projecting through the bottom of said cartridge holder when said cartridge holder is at said accommodation position for engaging said film spool of said film cartridge accommodated in said cartridge holder and for rotating said film spool, said cartridge holder being movable relative to said driving means so that the driving means is separate from said bottom of the cartridge holder when said cartridge holder is in said open position; and
    pressing means for pressing said film cartridge accommodated in said cartridge holder which is at said accommodation position toward said driving means along the axial direction of said film spool.

8. A photographic camera, using a film cartridge, which accommodates a strip of film wound on a film spool in a shell having a film passing slit such that a leader portion of said film strip is accommodated in said shell when said film cartridge is not loaded in said camera and such that said leader portion is forced out from said film passing slit of said shell after said film cartridge is loaded, said camera comprising:
    a cartridge chamber, for accommodating said film cartridge, having an opening for allowing said film cartridge to be inserted thereinto and removed therefrom in the axial direction of said film spool;
    an exposing section for exposing to light a part of said film fed out of said film passing slit of said film cartridge accommodated in said film cartridge chamber;
    pressing means for pressing said film cartridge accommodated in said cartridge chamber in a direction perpendicular to said axial direction of the film spool and parallel with the direction in which said film accommodated in said film cartridge is fed out;
    supporting means for supporting said film cartridge pressed by said pressing means to fixedly stabilize the position of said film passing slit of said film cartridge relative to said exposing section when said strip of film is being fed out from said film passing slit to said exposing section; and
    actuating means for actuating a pressing operation of said pressing means in association with an operation for inserting said film cartridge into said cartridge chamber and an operation for releasing the pressing operation of said pressing means in association with an operation for ejecting said film cartridge from said cartridge chamber.

9. A photographic camera as claimed in claim 8, wherein said actuating means is cartridge ejecting means for ejecting said film cartridge from said cartridge chamber.

10. A photographic camera as claimed in claim 8, wherein said actuating means is a cover for opening and closing said opening of said cartridge chamber, and said pressing operation of said pressing means is actuated in association with a closing operation of said cover while said release operation of said pressing means is released in association with the opening operation of said cover.

11. A photographic camera as claimed in claim 1, wherein said connecting means includes a connecting member which can contact a periphery of said film passing slit, and means for urging said film cartridge such that the periphery of said film passing slit of said film cartridge is pressed towards said connecting member.

12. A photographic camera as claimed in claim 8, further comprising releasing means for releasing the pressing operation of said pressing means in association with an operation for ejecting said film cartridge from said cartridge chamber.

* * * * *

UNITED STATES PATENT AND TRADEMARK OFFICE
CERTIFICATE OF CORRECTION

PATENT NO. : 5,142,316

DATED : August 25, 1992

INVENTOR(S) : Junichi TANII et al

It is certified that error appears in the above-identified patent and that said Letters Patent is hereby corrected as shown below:

On the title page:

In Section [75], delete "Tsui" and insert -- Tsuji --.

Signed and Sealed this

Seventh Day of September, 1993

Attest:

BRUCE LEHMAN

Attesting Officer

Commissioner of Patents and Trademarks